United States Patent [19]

Baur

[11] Patent Number: 5,102,089
[45] Date of Patent: Apr. 7, 1992

[54] VEHICLE ROOF-VIEW MIRROR ASSEMBLY

[76] Inventor: August Baur, R.R. #1, Box 254, Keene, N.H. 03431

[21] Appl. No.: 498,035

[22] Filed: Mar. 23, 1990

[51] Int. Cl.$^5$ .............................................. G02B 5/00
[52] U.S. Cl. ................................... 248/480; 248/486
[58] Field of Search ................... 248/467, 475.1, 476, 248/479, 480, 485, 486, 487, 489, 495, 206.5, 279; 350/604, 631, 632, 636, 639

[56] References Cited

U.S. PATENT DOCUMENTS

| | | | |
|---|---|---|---|
| 1,420,268 | 6/1927 | Hodny | 248/279 |
| 2,705,122 | 3/1955 | Whitehead | 248/480 |
| 3,305,202 | 2/1967 | Christenson | 248/480 |
| 3,784,288 | 1/1974 | Toy | 350/602 |
| 4,163,606 | 8/1979 | Granno | 350/639 |
| 4,469,405 | 9/1984 | Chin-Wun | 350/604 |
| 4,640,142 | 2/1987 | Cummins | 248/479 |

FOREIGN PATENT DOCUMENTS

| | | | |
|---|---|---|---|
| 1204976 | 1/1960 | France | 248/206.5 |
| 657977 | 10/1986 | Switzerland | 248/487 |
| 432032 | 1/1935 | United Kingdom | 248/480 |

*Primary Examiner*—Ramon O. Ramirez
*Assistant Examiner*—Robert A. Olson
*Attorney, Agent, or Firm*—George W. Dishong

[57] ABSTRACT

A vehicle roof-view mirror assembly which, because of the various optional adjusting means, allows the use of the mirror assembly with a wide assortment of vehicles and vehicle types. The vehicle roof-view mirror assembly or system for viewing the roof area and the space above the roof area maybe incorporated into the vehicle as original equipment or a factory installed assembly and/or is custom made for the make and model of vehicle on which the assembly is incorporated especially when the view expanding mirror is external to and forward of the vehicle windshield or windscreen. The adjustment of the mirror in order to better view the roof area may be done remotely by well known systems such as is used for the remote control of presently used side-view mirrors. There may also be incorporated a heater system in order to keep the mirror free of ice and snow. The vehicle roof-view mirror assembly is adapted to be removably and nondamagingly attachable to a vehicle in a manner permitting at least one occupant located in a position as a driver of the vehicle to view a roof area and a space above the roof area when the assembly is attached to the vehicle. The assembly comprises a view expanding optical system a apparatus for connecting, adjusting and rotating the optical system relative to a first support member. The optical system is upward and downward adjustable relative to the roof area when the assembly is attached to the vehicle, and rotatable relative to the first support member. The view expanding optical system is most preferably a mirror and the methods to adjust the mirror in order to better view the roof area may be done remotely by well known methods such as is used for the remote control of presently used side-view mirrors. There may also be incorporated a heater system in order to keep the mirror free of ice and snow.

4 Claims, 3 Drawing Sheets

VEHICLE ROOF-VIEW MIRROR ASSEMBLY

BACKGROUND OF THE INVENTION

1. Field of the Invention

This invention most generally relates to an auto roof mirror assembly which is adaptable for removably attaching to a vehicle in a manner which permits at least one occupant, including the driver, to view the roof area of the vehicle while the vehicle is stationary or in motion. More particularly, the invention is directed to a vehicle roof-view mirror assembly which may be mounted or removably attached, without damaging or altering the vehicle in any way, to the roof of an automobile, truck, bus, van or other vehicle, so that at least the driver or other occupants can observe articles which may be attached to the top/roof or rear portion of the vehicle.

2. Description of the Prior Art

Presently there is nothing available that permits the safe viewing while driving a motor vehicle of the roof area of the vehicle. When there is a roof rack which is either a standard component on the vehicle or removably attached, and the rack has luggage or other material loaded onto it, the driver, or other passengers have no reasonable way to determine whether the load in the rack is shifting or otherwise not adequately secured. The vehicle must be stopped periodically to determine the status of the roof rack and the contents of it.

The U.S. Pat. No. 3,784,288 to Toy relates to a periscopic rear view optical system for vehicles. The intent of the invention is to provide a view of objects to the rear of the car without the necessity of line of sight as is required by conventional rear view mirrors. The invention is complicated and does not address the concerns of the invention disclosed herein nor does it disclose the instant vehicle roof-view mirror apparatus or assembly. Further, one would not find any obvious basis in Toy to create or make the instant invention.

All of the patents which were developed in the patentability search except for U.S. Pat. No. 4,469,405 to Chin-Wun have as the primary object an alternate means for viewing objects to the rear of the vehicle using a periscopic type of assembly. They all require an aperture to be cut into the car roof in order to use the assembly.

The Chin-Wun patent relates to a back view mirror, by which the driver can see the view straight backward of the car body. Thus when a car is to be backed up the driver can now know what is happening directly behind the rear end of the car body.

None of the prior art which has been studied or which is known to to inventor hereof satisfies the need for viewing the roof area of a vehicle in a simple and economically feasible way. The present invention, because of the various optional adjusting means, allows the use of the mirror assembly with a wide assortment of vehicles and vehicle types. The invention also relates to means for viewing the roof area and the space above the roof area which is incorporated into the vehicle as original equipment or factory installed assembly and/or is custom made for the make and model of vehicle on which the assembly is incorporated especially when the view expanding mirror is external to and forward of the vehicle windshield or windscreen.

SUMMARY OF THE INVENTION

The present invention is it≦s most simple form or embodiment is directed to an auto roof mirror assembly which is adaptable for removably attaching to a vehicle in a manner which permits at least one occupant, including the driver, to view the roof area of the vehicle while the vehicle is stationary or in motion.

A primary object of the invention is to provide a vehicle having installed thereon a vehicle roof-view mirror assembly wherein the assembly fi affixed to the vehicle as a part of the manufacture of the vehicle and which is dimensionally configured and affixed to permit at least one occupant located in a position as a drive of the vehicle to view a roof area and a space above the roof area. The vehicle roof-view mirror assembly comprises a view expanding optical system appropriately located forward of the occupant and a means to adjust the optical system to permit the viewing by the occupant of the roof area and the space above the roof area. The view expanding optical system is most preferably a mirror and the means to adjust the mirror in order to better view the roof area may be done remotely by well known means such as is used for the remote control of presently used side-view mirrors. There may also be incorporated a heater system in order to keep the mirror free of ice and snow.

A more particular object of the present invention to provide a vehicle roof-view mirror assembly adapted to be removably and nondamagingly attachable to a vehicle in a manner permitting at least one occupant located in a position as a driver of the vehicle to view a roof area and space above the roof area when the assembly is attached to the vehicle. The assembly comprises a view expanding optical system a means for connecting, adjusting and rotating the optical system relative to a first support member. The optical system is upward and downward adjustable relative to the roof area when the assembly is attached to the vehicle, ad rotatable relative to the first support member. There is also a second support member pivotably connected to the first support member such that the first support member is forward and rearward pivotable relative to the roof area when the assembly is attached to the vehicle. There is also a first and a second attaching means each slidably in connection with the second support member. The view expanding optical system is most preferably a mirror and the means to adjust the mirror in order to better view the roof area may be done remotely by well known means such as is used for the remote control of presently used side-view mirrors. There may also be incorporated a heater system in order to keep the mirror free of ice and snow.

These and further objects of the present invention will become apparent to those skilled in the art after a study of the present disclosure of the invention.

DESCRIPTION OF THE PREFERRED EMBODIMENTS

Figure 1:
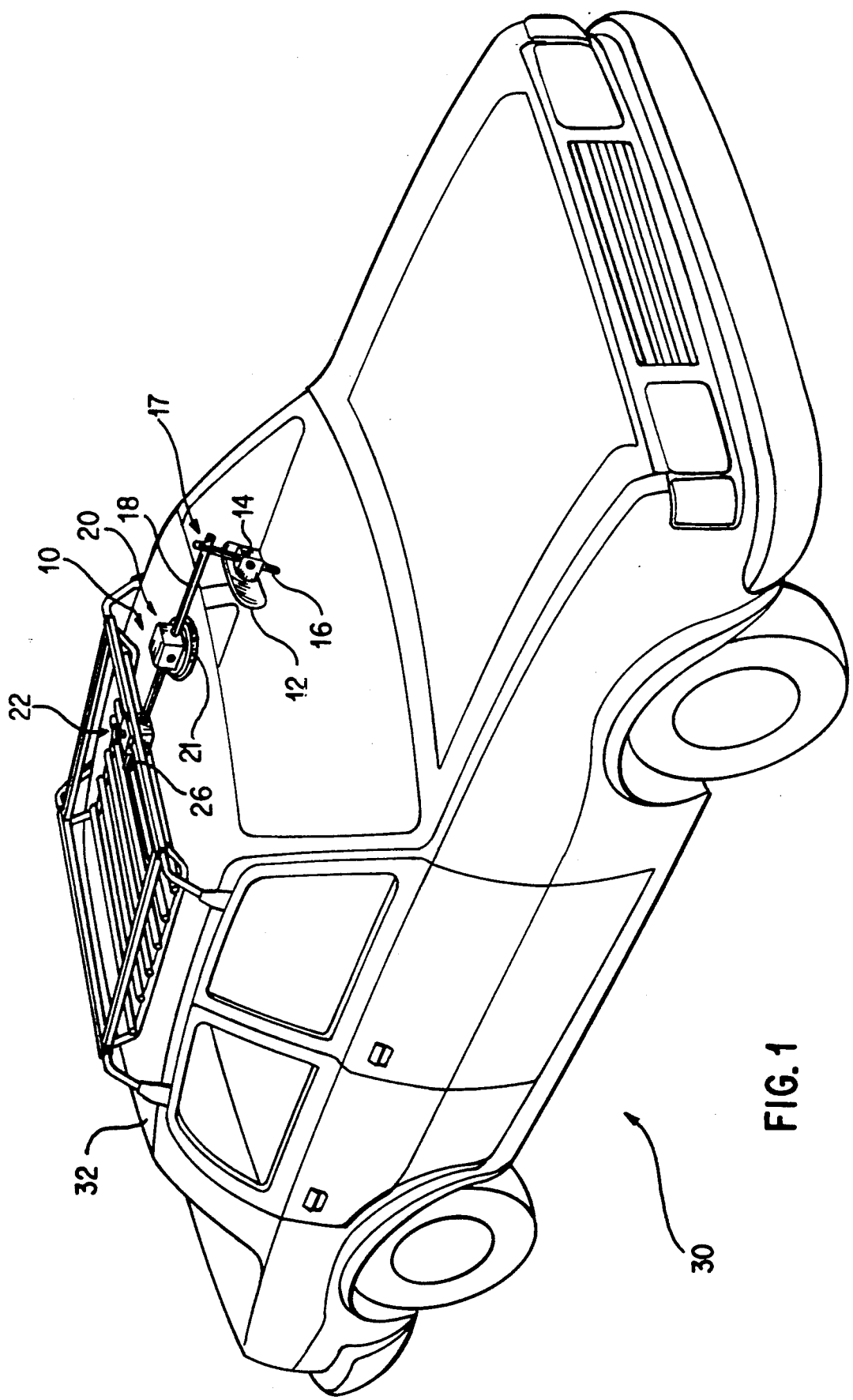
FIG. 1 is a perspective illustration of the manner in which the roof-view mirror assembly may be attached to the roof area of the vehicle.
Figure 2:
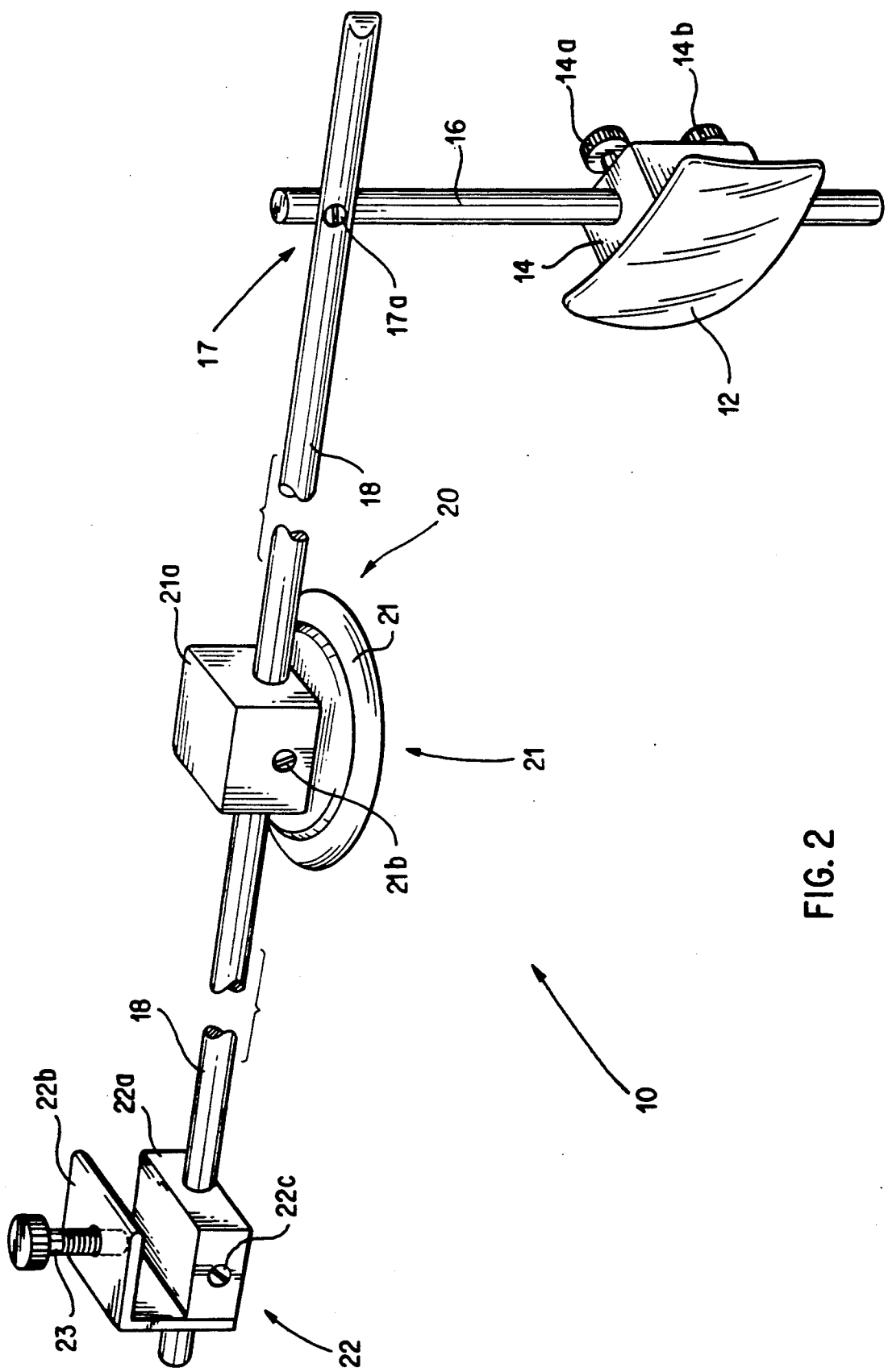
FIG. 2 is a perspective illustration of the roof-view mirror assembly showing typical means for attaching a magnet and by use of bracket fastener the assembly to a vehicle and also illustrating fasteners which are knurled screws and set screws for securing the various components after they have been adjusted for proper roof-viewing.

The following is a description of the preferred embodiment of the invention. While the vehicle roof-view mirror assembly is shown in the drawing figures as an assembly which would be easily mountable and easily removable from an automobile, it could very well be customized for a particular model and/or make of vehicle and be factory installed. The use of a view expanding optical system such as a width and height expanding mirror mounted forward of the vehicle windshield or forward of the operator or driver of the vehicle is within the scope of the present invention. It is clear that there may be variations in the size and the reflective properties of the view expanding optical system in order that roof-viewing may be accommodated on various sizes of vehicle.

The vehicle roof-view mirror assembly may be attached to the vehicle in any number of ways including the use of magnet, clamps which attach to a portion of a roof rack which may be a part of the vehicle or which may be added to the vehicle and a combination of devices such as tie-down straps etc. It is only necessary that the assembly be held in position in such a way so as to allow the observation of the roof area by either the driver/operator or other passenger of the vehicle.

It is obvious to one of ordinary skill, that the dimensions which may be implied from the drawing figures maybe varied to accommodate any number of sizes and types of vehicles such as automobiles, vans, busses, campers and other types of RV's. Included are those with and without windshields such as those vehicles used for moving material in warehouses and the like.

The materials used to make the vehicle roof-view mirror assembly could be for example, steel, aluminum, plastic, or any other material or alloys and combination of materials which would provide the strength and other characteristics necessary to achieve the intended purposes of the assembly. It should also be clear that it is not essential or necessary that the vehicle roof-view mirror assembly he made from a single type of material.

Reference is now made to FIGS. 1-4, all of which illustrate pictorially, the various elements of the preferred embodiment of the invention. The vehicle roof-view mirror assembly 10, in the preferred embodiment is shown attached to automobile 30 and adjusted so that the roof area 32 and a portion of the space above the roof area 32 may be observed by an occupant of vehicle 30. As is clearly shown, a first attaching means 20 which consists of a magnet portion 21 and the second support rod attaching means 21a is positioned appropriately onto the roof of the car 30. The second attaching means 22 which consists of support member attaching means 22a and bracket portion 22b effectively fixes with the tightening of bracket fastener 23, the assembly 10 to the roof rack forward horizontal member 26, thereby making the assembly securely affixed or attached to the vehicle 30. The second support member 18 is slidably adjusted in attaching means 20 and 22 until the mirror 12 is properly located forward of the windshield of the vehicle 30. Set screws 22b and 21c are tightened so that support member 18 will not rotate or move forward or backward. Additionally support member 18 is rotated to a position which places the view expanding mirror means 12 in the proper attitude.

The first support member 16 is pivotably adjusted along with the adjustment of mirror 12 and the mirror attaching means 14 until an acceptable view of the roof area 32 is obtained. The assembly consisting of the mirror 12 and the mirror attaching means 14 is slidable upward and downward and rotatable on the first member 16. When a proper position has been found, the top fasteners 14a and the bottom fastener 14b may be tightened in order to fix the position of the mirror 12. It is of course optional to sue two such fastener 14a and 14b. One or the other of these would be adequate. However, in the alternative embodiment shown in FIG. 3 fasteners 14a and 14b in combination with the elongated aperture 14c provide for the pivotal adjustment of mirror 12. Thus member 16a may be used as a replacement for the combination of members 14 and 16 connected at pivotably adjustable point 17. Member 16a mounts similarly to member 18 to both the first and second attaching means 20 and 22 respectively. Where joint 17 is used clamping screw 17a is used to hold the joint 17 in the properly adjusted position.

Figure 4:
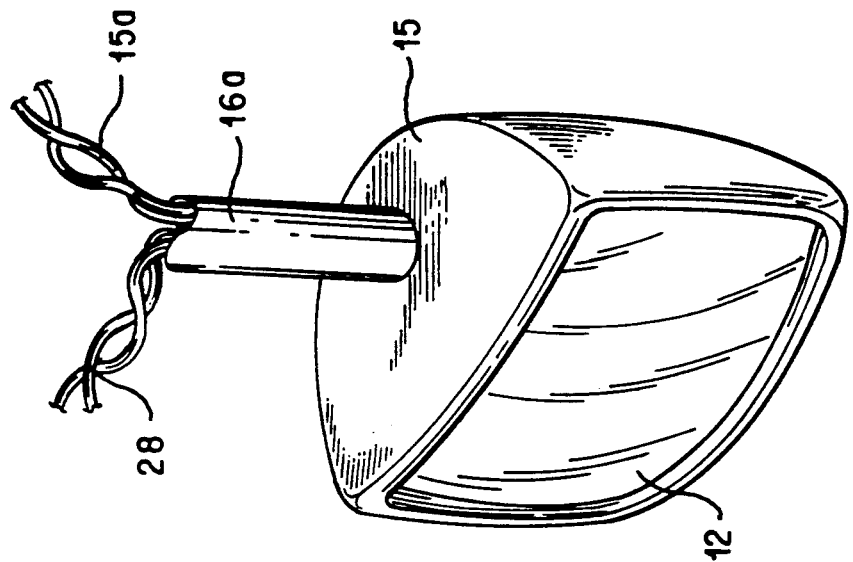
FIG. 4 is a sketch illustrating the use of a mirror adjusting and heating system and whereby the mirror is located within the housing of the system.
Figure 3:
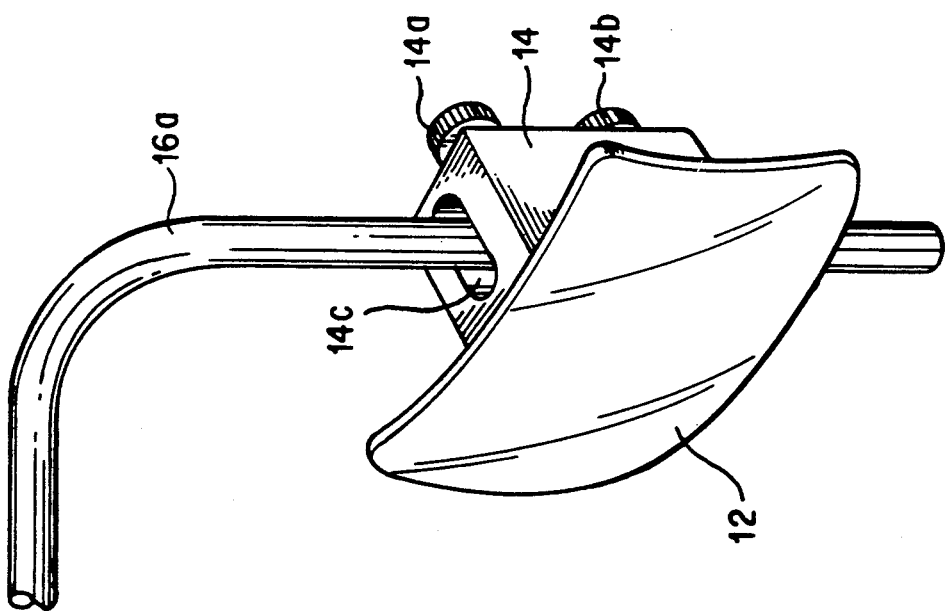
FIG. 3 illustrates a modified mirror assembly with elongated holes thereby permitting pivotable, and rotatable and up-down adjustment of the mirror to effectively view the roof top area.

FIG. 4 illustrates the use of a mirror adjusting and/or heating system 15 which houses mirror 12. System 15 may be similar to the apparatus known and used to control by remote control means the orientation of presently known side-view mirrors. Electrical power may be provided through control wires 15a as well as electrical power for defrosting mirror 12 may be provided through wires 28. This type of system may be useful where the vehicle is factory equipped with the roof-view mirror assembly in which instance the assembly would take on a very custom appearance as compared with the assembly 10 illustrated in the drawing figures.

It is thought that the vehicle roof-view mirror assembly of the present invention and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A vehicle roof-view mirror assembly wherein said assembly is affixed to a vehicle and which is adjustable, dimensionally configured and affixed to permit at least one occupant of said vehicle to view only a roof area and space above said roof area, wherein said vehicle roof-view mirror assembly comprises: a view expanding optical system appropriately located forward of said occupant and external of said vehicle; a means for supporting said view expanding optical system; means for connecting, said view expanding optical system to said support means; means to upwardly and downwardly adjust, relative to said roof area, said view expanding optical system; means to forwardly and rearwardly adjust, relative to said roof area, said view expanding optical system; means to horizontally and vertically rotatably adjust, relative to said roof area, said view expanding optical system; and all of said means to adjust to permit the viewing by said occupant of only said roof area and said space above said roof area.

2. The vehicle roof-view mirror assembly according to claim 1 wherein said view expanding optical system is a mirror and wherein said means to horizontally and vertically rotatably adjust, relative to said roof area, said view expanding optical system further comprises means for horizontally and vertically rotatably adjusting said mirror by said occupant from within said vehicle.

3. The vehicle roof-view mirror assembly according to claim 1 further comprising a means for heating said optical system 4. The vehicle roof-view mirror assembly according to claim 1 wherein said means to horizontally and vertically rotatably adjust relative to said roof area, said view expanding optical system is controllable by said occupant from within said vehicle.

* * * * *